(12) United States Patent
Lin et al.

(10) Patent No.: US 10,469,976 B2
(45) Date of Patent: Nov. 5, 2019

(54) WEARABLE ELECTRONIC DEVICE AND VIRTUAL REALITY SYSTEM

(71) Applicant: HTC Corporation, Taoyuan (TW)

(72) Inventors: Tz-Chian Lin, Taoyuan (TW); Iok-Kan Choi, Taoyuan (TW); Chun-Min Liao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 244 days.

(21) Appl. No.: 15/480,352

(22) Filed: Apr. 5, 2017

(65) Prior Publication Data

US 2017/0332187 A1 Nov. 16, 2017

Related U.S. Application Data

(60) Provisional application No. 62/334,469, filed on May 11, 2016.

(51) Int. Cl.
| | |
|---|---|
| *H04S 7/00* | (2006.01) |
| *H04R 1/40* | (2006.01) |
| *H04R 5/033* | (2006.01) |
| *H04R 5/04* | (2006.01) |
| *H04R 3/00* | (2006.01) |
| *G10L 17/00* | (2013.01) |
| *G10L 17/22* | (2013.01) |
| *G02B 27/01* | (2006.01) |

(52) U.S. Cl.
CPC ............ *H04S 7/304* (2013.01); *G10L 17/005* (2013.01); *G10L 17/22* (2013.01); *H04R 1/406* (2013.01); *H04R 5/033* (2013.01); *H04R 5/04* (2013.01); *H04S 7/302* (2013.01); *G02B 2027/014* (2013.01); *H04R 3/005* (2013.01); *H04S 2400/01* (2013.01); *H04S 2400/11* (2013.01)

(58) Field of Classification Search
CPC combination set(s) only.
See application file for complete search history.

(56) References Cited

U.S. PATENT DOCUMENTS

| | | | |
|---|---|---|---|
| 9,530,426 B1 * | 12/2016 | Wright | .................. H04S 1/002 |
| 2010/0008516 A1 | 1/2010 | Ichikawa et al. | |
| 2010/0008546 A1 | 1/2010 | Hiroshi | |
| 2013/0141576 A1 | 6/2013 | Lord | |

(Continued)

OTHER PUBLICATIONS

Corresponding partial European search report dated Oct. 16, 2017.
Corresponding Taiwan office action dated Jul. 12, 2019.

*Primary Examiner* — Sunita Joshi
(74) *Attorney, Agent, or Firm* — CKC & Partners Co., LLC (57) ABSTRACT

A wearable electronic device includes a microphone array, stereo speakers and a control circuit. The microphone array is configured for sensing an environmental sound. The control circuit is coupled to the microphone array and the speaker. The control circuit is operable to calculate a distance and a directional angle from a source of the environmental sound to the wearable electronic device according to the environmental sound sensed by the microphone array, to generate an effect sound corresponding to the environmental sound, to process the effect sound for simulating the effect sound to be originated from a virtual location with the distance and the directional angle relative to the wearable electronic device, and to broadcast the processed effect sound through the pair of speakers.

20 Claims, 11 Drawing Sheets

(56) References Cited

U.S. PATENT DOCUMENTS

| | | | |
|---|---|---|---|
| 2013/0236040 A1* | 9/2013 | Crawford | H04S 7/304 |
| | | | 381/310 |
| 2015/0172814 A1 | 6/2015 | Usher et al. | |
| 2015/0211858 A1* | 7/2015 | Jerauld | G02B 27/017 |
| | | | 701/541 |
| 2015/0341734 A1 | 11/2015 | Sherman | |
| 2016/0088417 A1 | 3/2016 | Kim et al. | |
| 2016/0313973 A1* | 10/2016 | Yajima | G06F 3/165 |

* cited by examiner

WEARABLE ELECTRONIC DEVICE AND VIRTUAL REALITY SYSTEM

CROSS-REFERENCE TO RELATED APPLICATION

This application claims the priority benefit of U.S. Provisional Application Ser. No. 62/334,469, filed May 11, 2016, the full disclosure of which is incorporated herein by reference.

BACKGROUND

Field of Invention

The present application relates to a wearable electronic device and a virtual reality system. More particularly, the present application relates to a sound-based detection on the wearable electronic device and the virtual reality system.

Description of Related Art

Wearable electronic devices are popular in many applications. For example, some users may wear head-mounted display (HMD) devices to experience a Virtual Reality (VR) world or Augmented Reality (AR) world.

When these users wear the HMD devices, their vision will be covered by displayers of the HMD devices and their ears will be covered by headphones or earphones of the HMD devices, such that it is difficult for these users to aware a sound in a surrounding environment. These users will not able to hear stepping sounds of someone passing by, ringing sounds of phone calls, or calling or warning messages from some others.

SUMMARY

An embodiment of the present disclosure is to provide a wearable electronic device, which can include a microphone array, stereo speakers and a control circuit. The microphone array is configured for sensing an environmental sound. The control circuit is coupled to the microphone array and the stereo speakers. The control circuit is operable to calculate a distance and a directional angle from a source of the environmental sound to the wearable electronic device according to the environmental sound sensed by the microphone array. The control circuit is further operable to generate an effect sound corresponding to the environmental sound. The control circuit is further operable to process the effect sound for simulating the effect sound to be originated from a virtual location with the distance and the directional angle relative to the wearable electronic device. The control circuit is further operable to broadcast the processed effect sound through the stereo speakers.

Another embodiment of the present disclosure is to provide a virtual reality system including a first wearable electronic device and a second wearable electronic device. The first wearable electronic device includes a first microphone array, a first network interface circuit and a first control circuit. The first microphone array is configured for sensing a first environmental sound of an environmental scene. The first control circuit is coupled to the first microphone array and the first network interface circuit. The first control circuit is operable to calculate a first distance and a first directional angle from a source of the first environmental sound to the first wearable electronic device according to the first environmental sound. The second wearable electronic device includes a second microphone array, a second network interface circuit and a second control circuit. The second microphone array is configured for sensing a second environmental sound of the environmental scene. The second network interface circuit is communicated with the first network interface circuit. The second network interface circuit is configured for receiving the first environmental sound, the first distance and the first directional angle from the first wearable electronic device. The second control circuit is coupled to the second microphone array and the second network interface circuit.

The second control circuit is operable to calculate a second distance and a second directional angle from a source of the second environmental sound to the second wearable electronic device according to the second environmental sound. The second control circuit is operable to calculate a relative positional relationship between the first wearable electronic device and the second wearable electronic device according to the first distance, the first directional angle, the second distance and the second directional angle.

Another embodiment of the present disclosure is to provide a control method, which is suitable for a wearable electronic device including a microphone array and stereo speakers. The control method includes following steps. An environmental sound is sensed by the microphone array. A distance and a directional angle from a source of the environmental sound to the wearable electronic device are calculated according to the environmental sound. An effect sound is generated corresponding to the environmental sound. The effect sound is processed for simulating the effect sound to be originated from a virtual location with the distance and the directional angle relative to the wearable electronic device. The processed effect sound is broadcasted through the stereo speakers.

Another embodiment of the present disclosure is to provide a control method, which is suitable for a virtual reality system including a first wearable electronic device and a second wearable electronic device. The control method includes following steps. A first environmental sound of an environmental scene is sensed by the first wearable electronic device. A second environmental sound of the environmental scene is sensed by the second wearable electronic device. A first distance and a first directional angle from a source of the first environmental sound to the first wearable electronic device are calculated according to the first environmental sound.

A second distance and a second directional angle from a source of the second environmental sound to the second wearable electronic device are calculated according to the second environmental sound. A relative positional relationship between the first wearable electronic device and the second wearable electronic device is calculated according to the first distance, the first directional angle, the second distance and the second directional angle.

It to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIG. 6 is a schematic diagram illustrating a spatial relationship between the source, the first microphone and the second microphone in. FIG. 1.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

Figure 1:
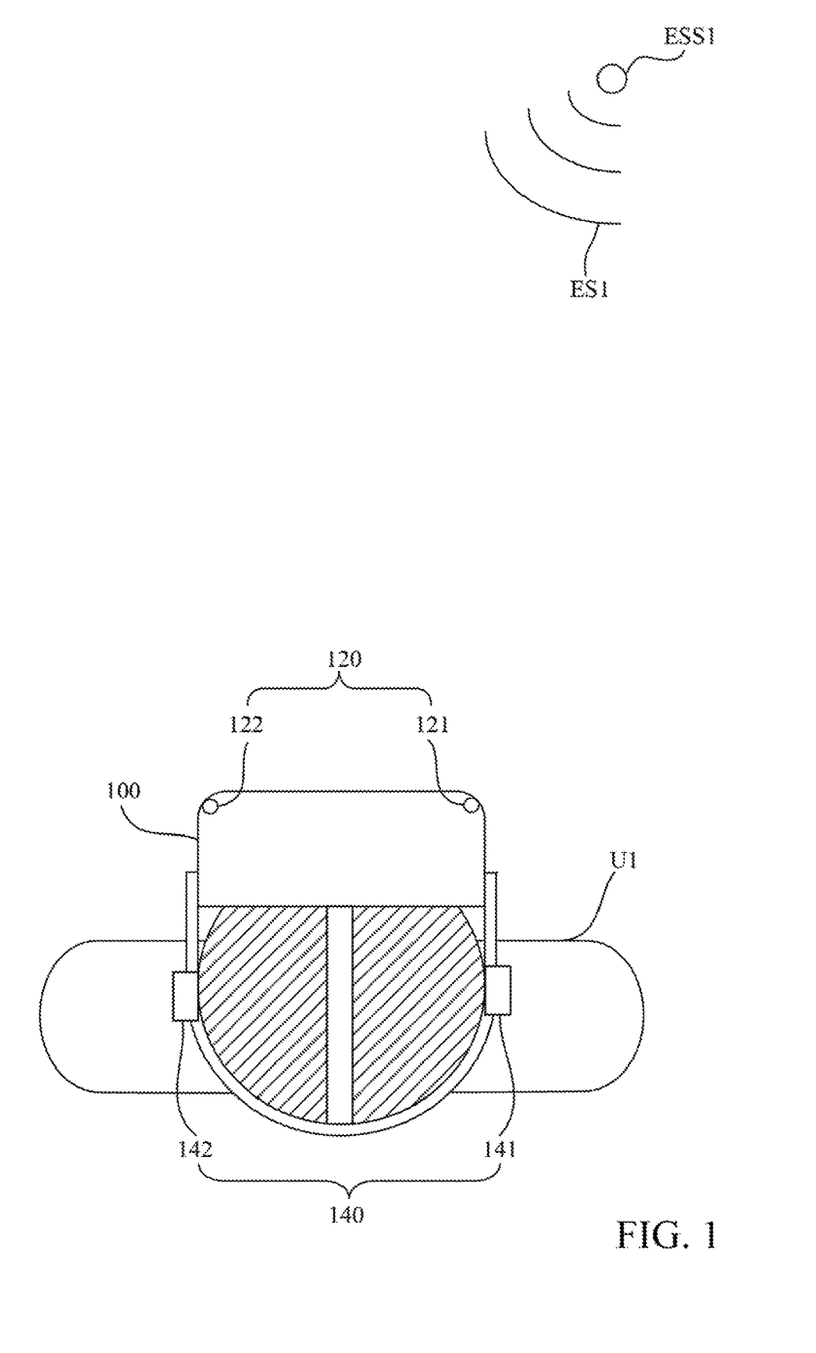
FIG. 1 is a schematic diagram illustrating a wearable electronic device in a real sense according to some embodiments of the disclosure.
Figure 2:
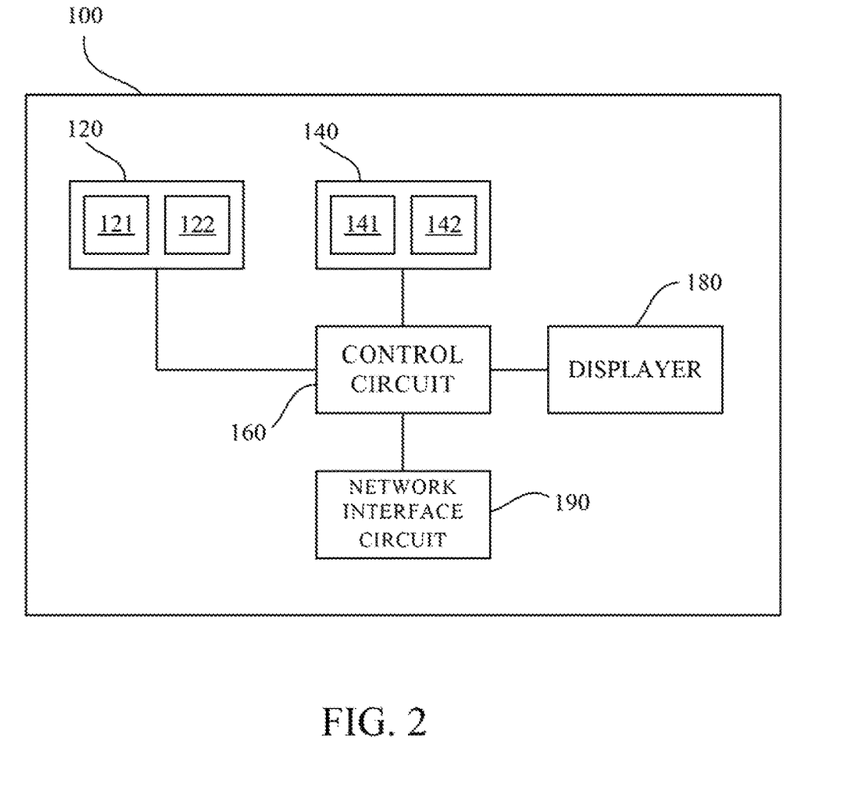
FIG. 2 is a schematic block diagram illustrating the wearable electronic device shown in FIG. 1.

Reference is made to FIG. 1 and FIG. 2. FIG. 1 is a schematic diagram illustrating a wearable electronic device 100 in a real sense according to some embodiments of the disclosure. FIG. 2 is a schematic block diagram illustrating the wearable electronic device 100 shown in FIG. 1. As shown in FIG. 1 and FIG. 2, the wearable electronic device 100 includes a microphone array 120, stereo speakers 140 and a control circuit 160. The control circuit 160 is coupled to the microphone array 120 and the stereo speakers 140.

In an embodiment shown in FIG. 1, the wearable electronic device 100 is a head-mounted display (HMD) device, such as a virtual reality (VR) headset or an Augmented Reality (AR) headset as shown in the embodiments of FIG. 1. The VR headset or the AR headset is realized by a stand-alone HMD device, or a combination of a smartphone and a headset attachment for holding the smartphone. A user U1 may wear the wearable electronic device 100 on his/her head. As shown in FIG. 2, the wearable electronic device 100 further includes a displayer 180. The displayer 180 is configured for showing a virtual reality scene to the user U1. In some embodiments, the displayer 180 may include two displaying panels for both eyes of the user U1, and these two displaying panels may display parallax images to two eyes of the user U1 to create a virtual reality experience.

The wearable electronic device 100 may further include a network interface circuit 190 as shown in FIG. 2. The network interface circuit 190 can be a WiFi transceiver, a Zigbee transceiver, a telecommunication network transceiver (e.g., 2G, 3G, 4G and/or 5G telecommunication networks), a LAN network transceiver and/or any equivalent network transceiver. The network interface circuit 190 of the wearable electronic device 100 is wirelessly communicated with another wearable electronic device (not shown in figure).

The microphone array 120 is configured for sensing an environmental sound ES1 in the real scene. The environmental sound ES1 produced by a source ESS1 can be a stepping sound of someone passing by, a ringing sound of a phone call, a talking sound of another person, a music played by a television or any equivalent sound in the real scene around the user U1. The microphone array 120 includes at least two microphones disposed on different locations on the wearable electronic device 100. In the embodiment shown in FIG. 1, the microphone array 120 includes a first microphone 121 and a second microphone 122 for sensing sound samples corresponding to the environmental sound ES1 generated by the source ESS1. In this embodiment shown in FIG. 1, the first microphone 121 is located on the right side of the wearable electronic device 100, and the second microphone 122 is located on the left side of the wearable electronic device 100. In some examples, the microphone array 120 may include more than two microphones (not shown in figures) disposed on different locations on the wearable electronic device 100.

The stereo speakers 140 are configured for broadcasting an output audio to the user U1. In the embodiment shown in FIG. 1 and FIG. 2, the stereo speakers 140 include at least two speakers, which are a right earphone 141 and a left earphone 142 mounted on two ears of the user U1. In another example, the stereo speakers 140 may include a right channel loudspeaker and a left channel loudspeaker. In some other examples, the stereo speakers 140 may further include more than two speakers (not shown) located at different places relative to the user U1.

The control circuit 160 shown in FIG. 2 is coupled to the microphone array 120, the stereo speakers 140 and the displayer 180. In some examples, the control circuit 160 is a processor, a central processing unit, a control logic unit, an audio processing unit or any equivalent circuit component. The control circuit 160 is operated to calculate a distance and a directional angle from the source ESS1 of the environmental sound ES1 to the wearable electronic device 100 according to the environmental sound ES1 sensed by the microphone array 120. Details of aforesaid calculation are explained in the following paragraphs.

Figure 3:
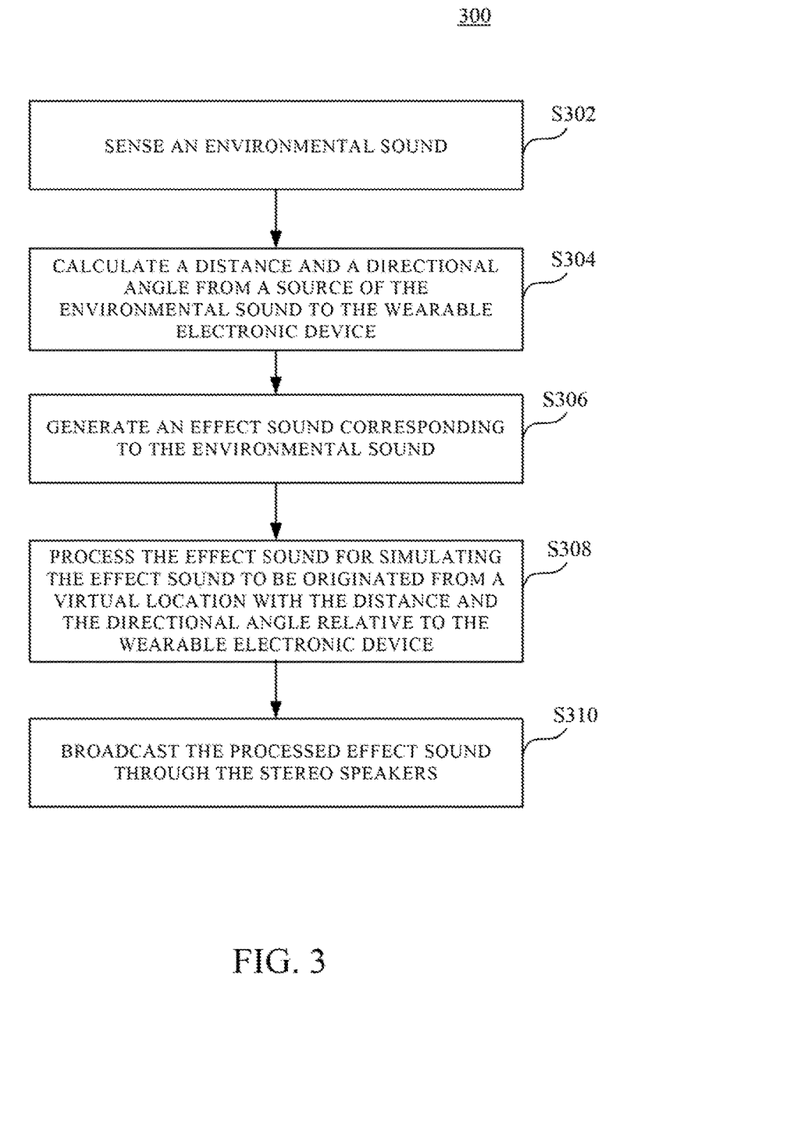
FIG. 3 is a flow diagram illustrating a control method according to an embodiment of this disclosure.

Reference is also made to FIG. 3, which is a flow diagram illustrating a control method 300 according to an embodiment of this disclosure. The control method 300 is suitable to be performed by the wearable electronic device as shown in FIG. 1 and FIG. 2.

As shown in FIG. 1 and FIG. 3, operation S302 of the control method 300 is performed to sense the environmental sound ES1 by the microphone array 120. In the embodiment, the first microphone 121 and the second microphone 122 disposed at different locations are configured for sensing sound samples corresponding to the environmental sound ES1.

The first microphone 21 and the second microphone 122 generate sound samples (e.g., vibration waveforms in time domain) of the environmental sound ES1 respectively. Based on a transformation algorithm (e.g., a Fast Fourier Transform), the sound samples can be transformed into intensity distributions over different frequencies.

Figure 4A:
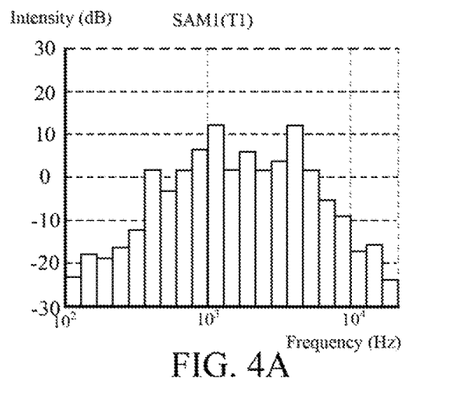
FIG. 4A to FIG. 4C are schematic diagrams illustrating intensity distributions over different frequencies of sound samples sensed by the first microphone respectively at different time points.
Figure 4B:
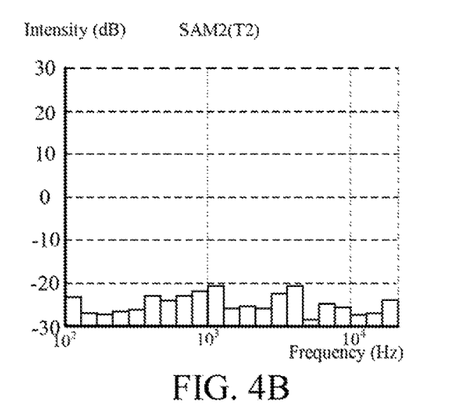
Figure 4C:
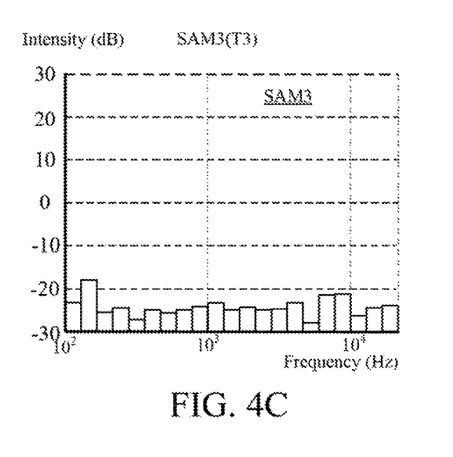
Figure 5A:
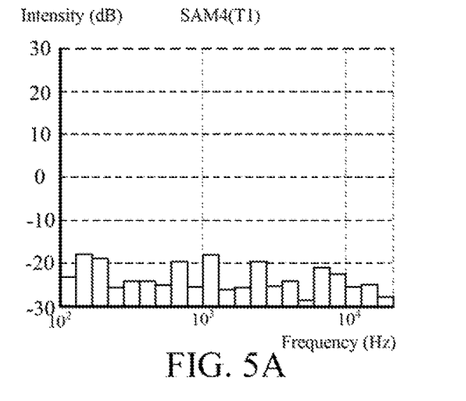
FIG. 5A to FIG. 5C are schematic diagrams illustrating intensity distributions over different frequencies of sound samples sensed by the second microphone respectively at different time points.
Figure 5B:
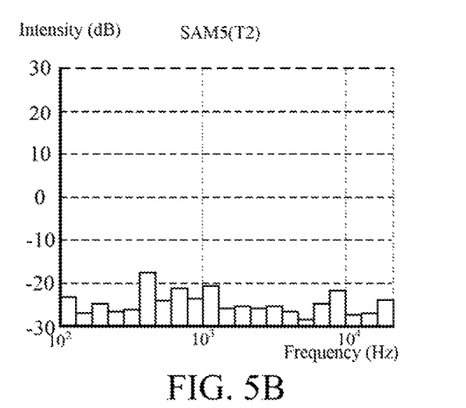
Figure 5C:
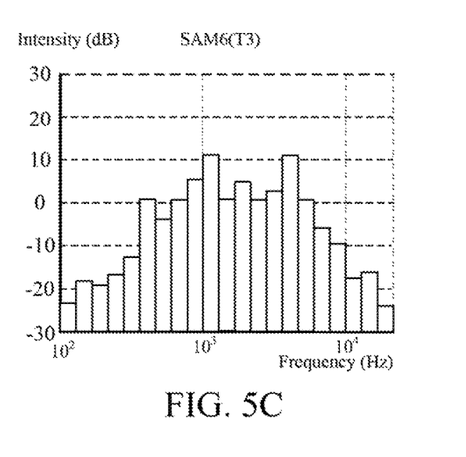

Reference is also made to FIG. 4A to FIG. 4C and FIG. 5A to FIG. 5C. FIG. 4A is a schematic diagram illustrating intensity distributions over different frequencies of the sound sample SAM1 sensed by the first microphone 121 at a time point T1. Similarly, FIG. 4B is a schematic diagram illustrating the sound sample SAM2 sensed by the first microphone 121 at another time point T2, which is later than the time point T1. Similarly, FIG. 4C is a schematic diagram illustrating the sound sample SAM3 sensed by the first microphone 121 at another time point T3, which is later than the time point T2. Similarly, FIG. 5A to FIG. 5C are schematic diagrams illustrating intensity distributions SAM4, SAM5 and SAM6 over different frequencies of sound samples sensed by the second microphone 122 respectively at time points T1, T2 and T3.

As shown in FIG. 1 and FIG. 3, operation S304 of the control method 300 is performed by the control circuit 160 to calculate a distance and a directional angle from the source ESS1 of the environmental sound ES1 to the wearable electronic device 100 according to the environmental sound ES1 sensed by the microphone array 140.

Figure 6:
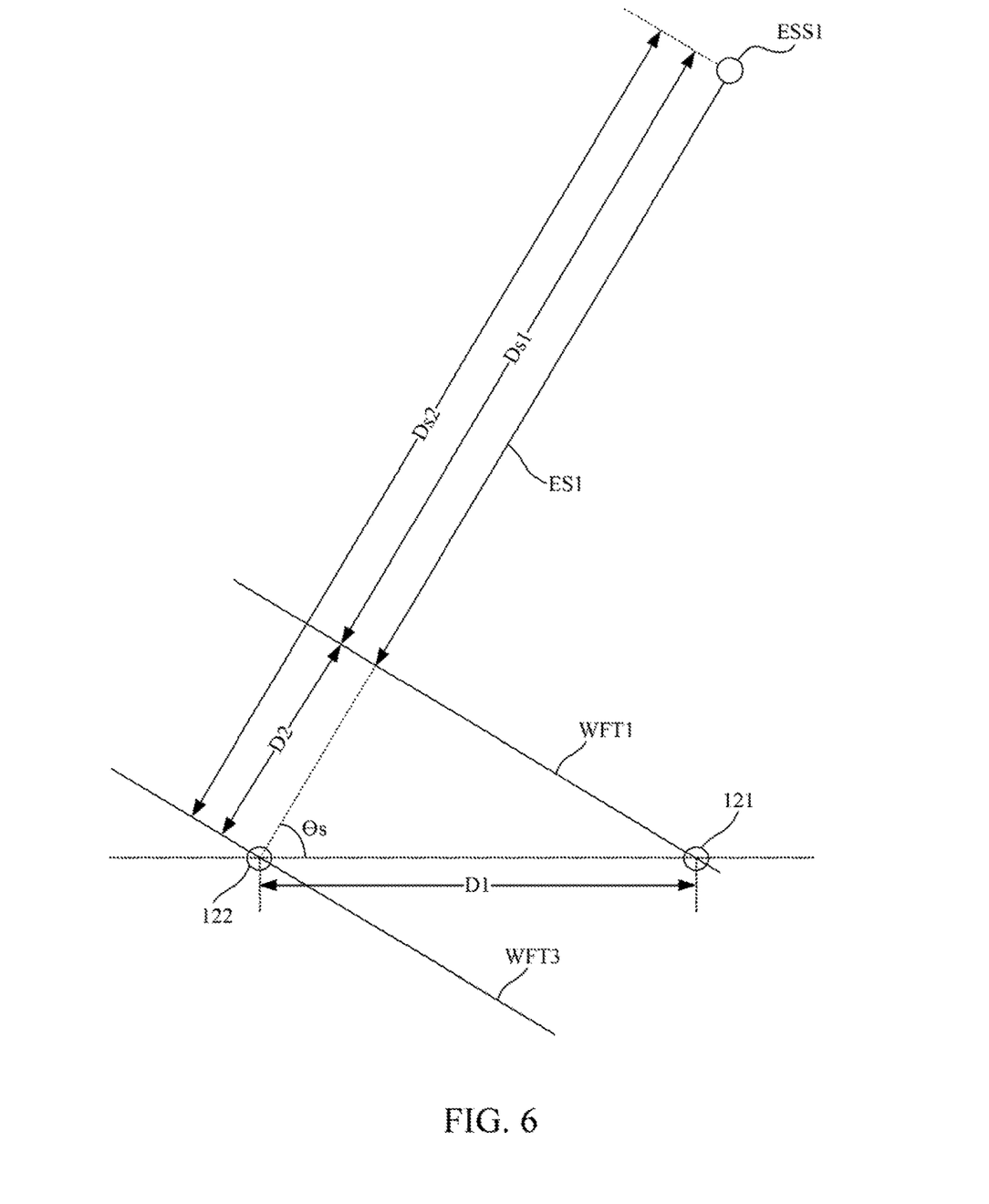

Reference is also made to FIG. 6, which is a schematic diagram illustrating a spatial relationship between the source ESS1, the first microphone 121 and the second microphone 122 in FIG. 1.

The control circuit 160 is operable to calculate the directional angle Θs from the source ESS1 of the environmental sound ES1 to the wearable electronic device 100 according to a timing difference between the sound samples related to the same environmental sound ES1 sensed by the first microphone 121 and the second microphone 122.

As shown in FIG. 6, the source ESS1 is assumed to be on the right side related to the wearable electronic device 100. Since the first microphone 121 and the second microphone 122 are disposed on different locations of the wearable electronic device 100, the environmental sound ES1 will reach the first microphone 121 and the second microphone 122 at different time points.

In the example shown in FIG. 6, a soundwave front WFT1 of the environmental sound ES1 will reach the first microphone 121 at first (assumed to be the time point T1). The soundwave front WFT3 of the environmental sound ES1 will reach the second microphone 121 later (assumed to be the time point T3). As shown in FIG. 4A, the sound sample SAM1 reflects the environmental sound ES1 sensed by the first microphone 121 at the time point T1. As shown in FIG. 5C, the sound sample SAM6 reflects the environmental sound ES1 sensed by the second microphone 122 at the time point T3.

In an example, the matching between the sound sample SAM1 and the sound sample SAM6 is found by calculating a correlation coefficient, between the sound sample SAM1 sensed by the first microphone 121 and each one of the sound samples SAM4-SAM6 sensed by the second microphone 122. In the example, the sound sample SAM6 is highly correlated to the sound sample SAM1, such that the sound sample SAM6 sensed by the second microphone 122 at the time point T3 is recognized to be matched to the sound sample SAM1 sensed by the first microphone 121 at the time point T1. In other words, correlation coefficients are calculated between each of the sound samples sensed by the first microphone 121 and each of the sound samples sensed by the second microphone 122, such that the sound samples sensed by two microphones to the same environmental sound ES1 can be recognized. Since the environmental sound ES1 reaches the first microphone 121 at the time point T1 and the environmental sound ES1 reaches the second microphone 122 at the time point T3, a time difference between the sound samples SAM1 and SAM6 sensed by the first microphone 121 and the second microphone 122 is the gap between the time point T1 and the time point T3.

As shown in FIG. 6, the directional angle Θs can be calculated by the following equations:

$$Td = \frac{D2}{C} = \frac{D1 \times \cos\theta s}{C} \quad (1)$$

$$\theta s = \cos^{-1}\left(\frac{C \times Td}{D1}\right) \quad (2)$$

In the equation (2), the distance D1 is a known value of the distance between the first microphone 121 and the second microphone 122, the constant C is a known value of a transmission speed of the sound wave, and the time difference Td is calculated from the gap between the time point T1 and the time point T3. In other words, the directional angle Θs can be calculated from the time difference Td between the sound samples SAM1 and SAM6 corresponding to the same environmental sound ES1 sensed by the first microphone 121 and the second microphone 122.

In an embodiment, the control circuit 160 is operable to calculate the distance from the source ESS1 of the environmental sound ES1 to the wearable electronic device 100 according to an intensity level of the sound samples SAM1-SAM6 sensed by the first microphone 121 or the second microphone 122.

In an embodiment, a distance between the first microphone 121 and the second microphone 122 is a known value. When the environmental sound ES1 is received respectively by the first microphone 121 or the second microphone 122, there will be an intensity level difference between the sound samples SAM1-SAM3 sensed by the first microphone 121 and the sound samples SAM4-SAM6 sensed by the second microphone 122.

When the source ESS1 of the environmental sound ES1 is farer from the first microphone 121 or the second microphone 122, the intensity levels of the sound samples SAM1-SAM6 will be lower. When the source ESS1 of the environmental sound ES1 is closer to the first microphone 121 or the second microphone 122, the intensity levels of the sound samples SAM1-SAM6 will be higher.

It is assumed that the distance between the first microphone 121 and the second microphone 122 is $D_{MIC}$ (not shown in figure), the intensity level difference between the sound sample sensed by the first microphone 121 and the sound sample sensed by the second microphone 122 is $L_{DIFF}$ (not shown in figure), an absolute sound volume detected by the first microphone 121 is $V_{MIC1}$ (not shown in figure), the distance Ds1 shown in FIG. 6 between the source ESS1 and the first microphone 121 can be calculated in an embodiment by:

$$Ds1 = V_{MIC1} \times \frac{D_{MIC}}{L_{DIFF}}$$

In another embodiment, the control circuit 160 is operable to estimate the distance Ds1 relative to the intensity level of the sound sample SAM1 sensed by the first microphone 121.

In another embodiment, the control circuit 160 is operable to estimate the distance Ds2 relative to the source ESS1 according to the intensity level of the sound sample SAM6 sensed by the first microphone 122.

In another embodiment, the control circuit 160 is operable to calculate the distance from the source ESS1 of the environmental sound ES1 to the wearable electronic device 100 by broadcasting a reference sound and then measuring a dip depth of frequency response of the reference sound.

Figure 7:
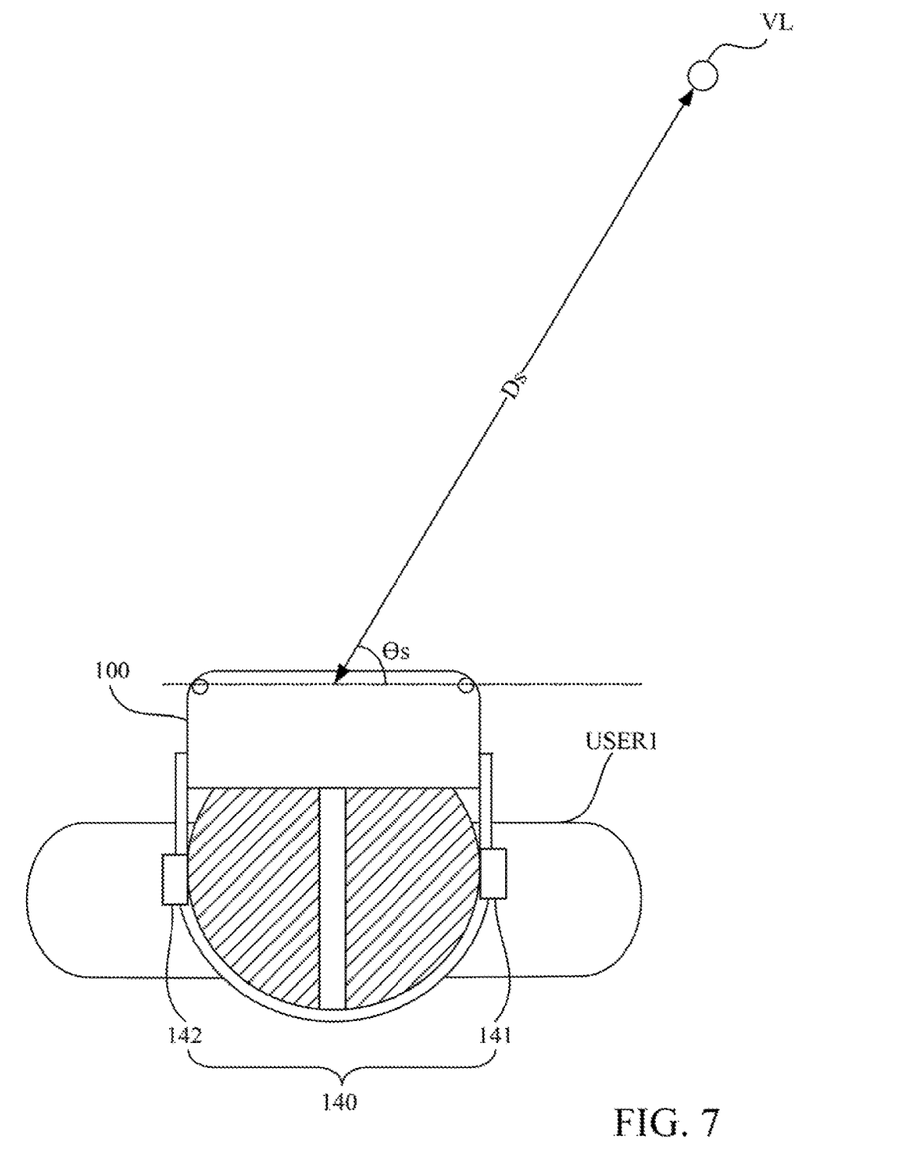
FIG. 7 is a schematic diagram illustrating the directional angle and the distance calculated in FIG. 3.

Reference is also made to FIG. 7, which is a schematic diagram illustrating the directional angle Θs and the distance Ds calculated in operation S304 in FIG. 3. The distance Ds in FIG. 7 between the source ESS1 and the wearable electronic device 100 can be defined as the distance Ds1, the distance Ds2, or an average value between the distances Ds1 and Ds2 shown in FIG. 6. Along with the directional angle Θs and the distance Ds, the control circuit 160 will be able to locate a virtual location VL, which is equal to an estimation position of the source ESS1.

The microphone array 120 is not limited to include two microphones. The microphone array 120 may further include more than two microphones for higher accuracy for calculating the directional angle Θs and the distance Ds.

As shown in FIG. 1 and FIG. 3, operation S306 of the control method 300 is performed by the control circuit 160 to generate an effect sound corresponding to the environmental sound ES1.

The environmental sound ES1 can be a stepping sound of someone passing by, a ringing sound of a phone call, a talking sound of another person, a music played by a television, etc.

In an embodiment, the effect sound generated by the control circuit 160 is equal to the original contents (i.e., the stepping sound, the ringing sound, the talking sound, the music, etc.) of the environmental sound ES1.

In another embodiment as shown in FIG. 1 and FIG. 2, the wearable electronic device 100 is a VR HMD device, and the displayer 180 is configured for showing a virtual reality scene (e.g., a haunted house, a castle, an outer space, an ancient world with dinosaurs or a future world) to the user U1. In this case, the effect sound generated by the control circuit 160 is generated by modifying the environmental sound ES1 according to an audio tone corresponding to the virtual reality scene. For example, the environmental sound ES1 including a stepping sound can be modified into a stepping sound of a dinosaur when the virtual reality scene is the ancient world with dinosaurs, or the environmental sound ES1 including a voice of a human can be modified into a voice of a ghost when the virtual reality scene is the haunted house.

As shown in FIG. 3 and FIG. 7, operation S308 is performed by the control circuit 160 to process the effect sound for simulating the effect sound to be originated from the virtual location VL with the distance Ds and the directional angle Θs relative to the wearable electronic device 100.

If the effect sound is played synchronously and equally loud to the right earphone 141 and the left earphone 142 of the stereo speaker 140, the effect sound will not sound real to the user U1, because a real sound shall reach the right ear and the left ear at slight different timings with slight different intensities. The effect sound generated in S306 will be processed in S308 into a right-channel effect sound and a left-channel effect sound. For example, the control circuit 160 can process the effect sound with a Head-Related Transfer Function (HRTF) algorithm based on the virtual location VL (which is assigned to be origin coordinates of the effect sound) to generate the right-channel effect sound and the left-channel effect sound. Based on the virtual location VL related to the stereo speaker 140, the Head-Related Transfer Function (HRTF) algorithm will apply different filters to generate the right-channel effect sound and the left-channel effect sound. In the example shown in FIG. 7, the left-channel effect sound will be slightly delayed relative to the right-channel effect sound, and the intensity of the left-channel effect sound will be slightly reduced relative to the intensity of the right-channel effect sound.

As shown in FIG. 1, FIG. 3 and FIG. 7, operation S310 is performed by the control circuit 160 to broadcast the processed effect sound (including the right-channel effect sound and the left-channel effect sound) through the stereo speakers 140, such that the user U1 may hear the sound with the distance and the direction angle similar to the environmental sound ES1.

Figure 8:
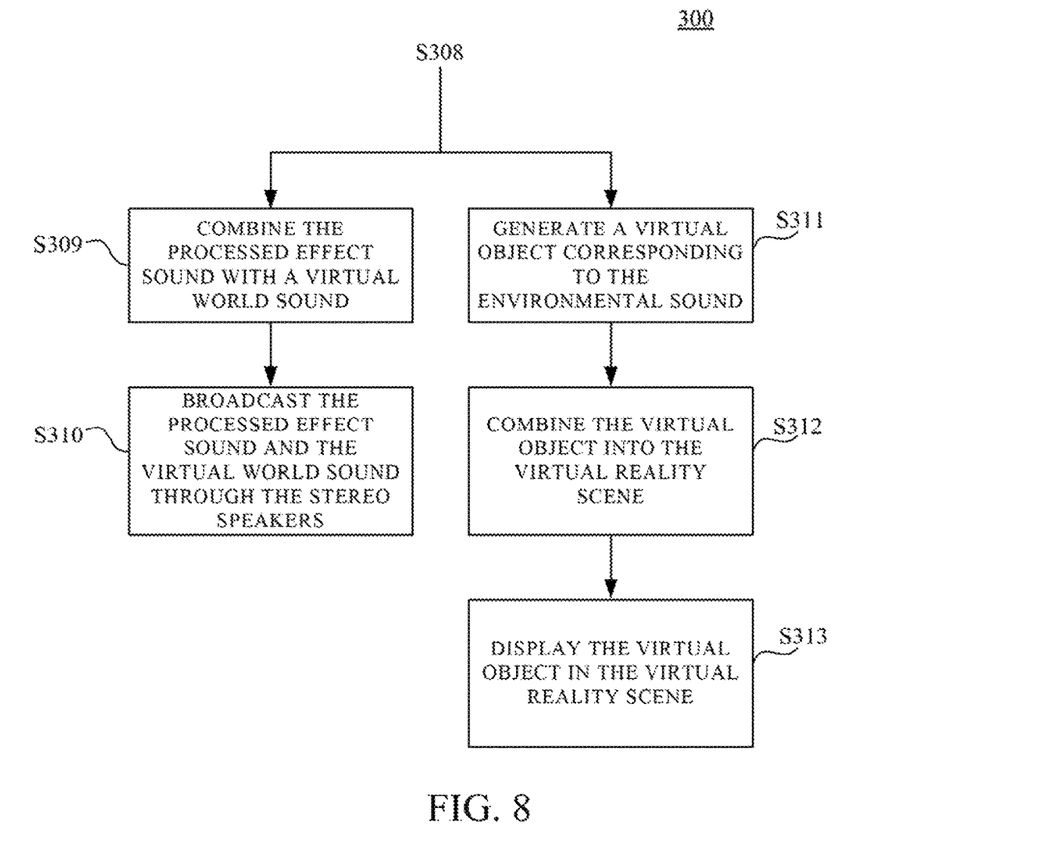
FIG. 8 is a flow diagram illustrating further operations of the control method in FIG. 3.

Reference is also made to FIG. 8, which is a flow diagram illustrating further operations S309, S311, S312 and S313 of the control method 300 in FIG. 3. In an embodiment, the wearable electronic device 100 is the VR HIVID device, and the displayer 180 is configured for showing the virtual reality scene. The virtual reality scene has a virtual world sound. As shown in FIG. 8, after the operation S308 is performed, operation S309 is performed by the control circuit 160 to combine the processed effect sound and the virtual world sound. Then, operation S310 is performed by the control circuit 160 to broadcast the processed effect sound and the virtual world sound together through the stereo speakers, such that the user U1 can hear the sound in the virtual scene and also the sound in the real environment at the same time.

In addition, as shown in FIG. 8, after the operation S308 is performed, operation S311 is performed by the control circuit 160 to generate a virtual object corresponding to the environmental sound. Operation S312 is performed by the control circuit 160 to combine the virtual object into the virtual reality scene. Operation S313 is performed by the control circuit 160 to display the virtual object in the virtual reality scene at the virtual location VL (referring to FIG. 7).

For example, when the environmental sound ES1 is a stepping sound of someone passing by, the virtual object generated according to the environmental sound ES1 can be a passenger, a walking monster or a moving enemy, etc. For example, when the environmental sound ES1 is music, the virtual object generated according to the environmental sound ES1 can be a marching band, a musician, etc. In this case, the virtual object will be shown at an optimal position corresponding to the environmental sound ES1.

Figure 9:
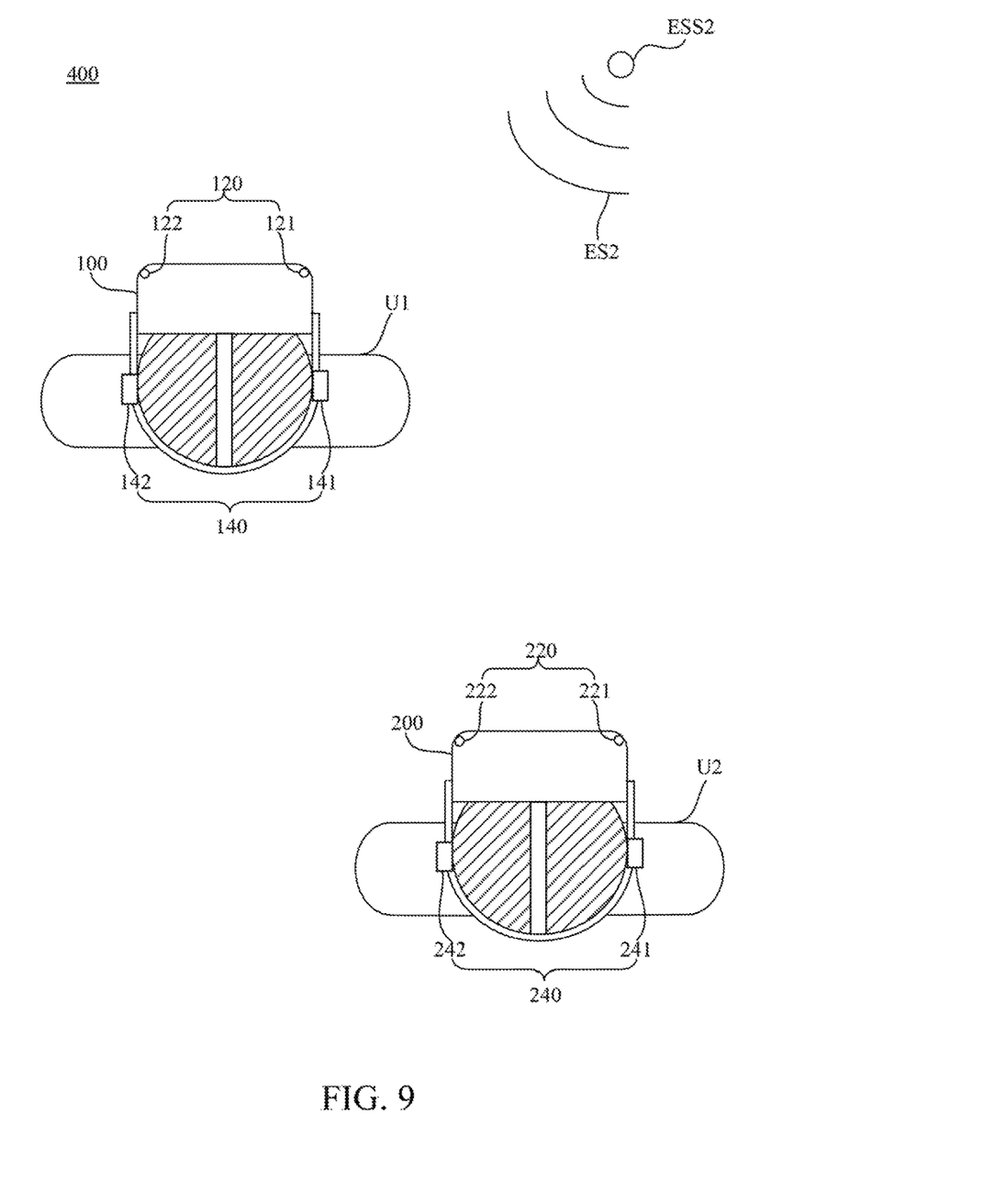
FIG. 9 is a schematic diagram illustrating a virtual reality system according to an embodiment of the disclosure.
Figure 10:
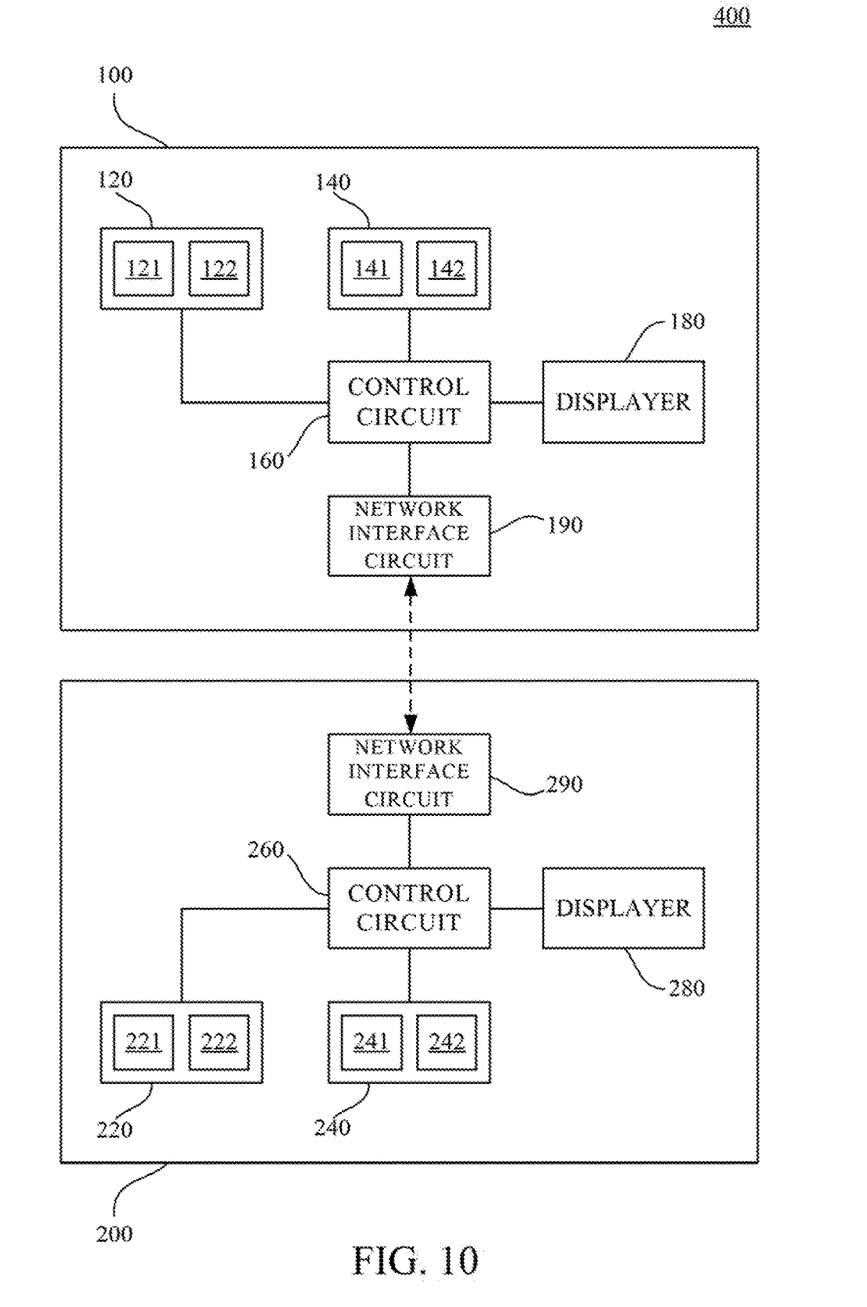
FIG. 10 is a block diagram illustrating two wearable electronic devices of the virtual reality system in FIG. 9.

Reference is also made to FIG. 9 and FIG. 10. FIG. 9 is a schematic diagram illustrating a virtual reality system 400 according to an embodiment of the disclosure. As shown in FIG. 9, the virtual reality system 400 includes two wearable electronic devices 100 and 200. FIG. 10 is a block diagram illustrating two wearable electronic devices 100 and 200 of the virtual reality system 400 in FIG. 9.

As shown in FIG. 10, each of the wearable electronic devices 100 and 200 include a microphone array 120 or 220, stereo speakers 140 or 240, a control circuit 160 or 260, a displayer 180 or 280, and a network interface circuit 190 or 290. The wearable electronic devices 100 and 200 of the virtual reality system 400 in FIG. 10 are similar to the wearable electronic device 100 shown in FIG. 1 and FIG. 2. Detail explanations of aforesaid components of the wearable electronic device 100 and 200 of the virtual reality system 400 in FIG. 10 can be referred to embodiments of the wearable electronic device 100 in FIG. 1 and FIG. 2, and the same explanations are not repeated here again. The wearable electronic devices 100 and 200 of the virtual reality system 400 can independently performed the control method 300 in FIG. 3. The microphone array 120 of the wearable electronic device 100 includes a first microphone 121 and a second microphone 122. The microphone array 220 of the wearable electronic device 200 also includes another first microphone 221 and another second microphone 222.

Figure 11:
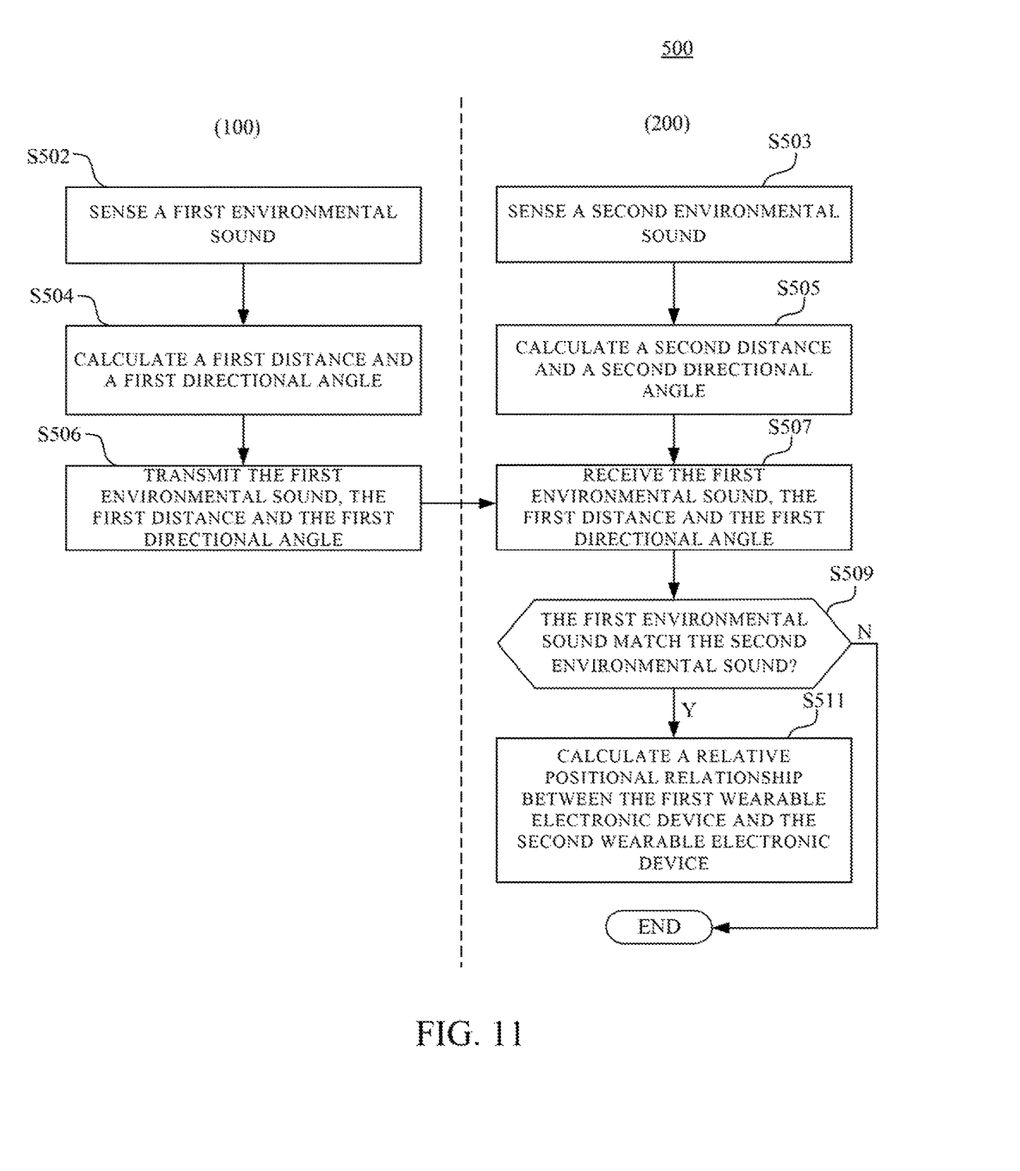
FIG. 11 is a flow diagram illustrating a control method performed by the virtual reality system in FIG. 10.

Reference is also made to FIG. 11, which is a flow diagram illustrating a control method 500 performed by the virtual reality system 400 in FIG. 10.

As shown in FIG. 10 and FIG. 11, in regard of the wearable electronic devices 100, operation S502 is performed to sense a first environmental sound (which is the environmental sound ES2 generated by the source ESS2 in this case) by the microphone array 140 of the wearable electronic devices 100. Operation S504 is performed to calculate a first distance and a first directional angle from the source ESS2 of the environmental sound ES2 to the wearable electronic device 100 according to the first environmental sound (which is the environmental sound ES2 in this case). Details of the calculation in operation S504 can be referred to explanations of the operation S304 and FIG. 6. Operation S506 is performed to transmit the first distance and the first directional angle from the wearable electronic device 100 to the wearable electronic device 200.

In regard of the wearable electronic devices 200, operation S503 is performed to sense a second environmental sound (which is also the environmental sound ES2 generated by the source ESS2 in this case) by the microphone array 220 of the wearable electronic devices 200. Operation S505 is performed to calculate a second distance and a second directional angle from the source ESS2 of the environmental sound ES2 to the wearable electronic device 200 according to the second environmental sound (i.e., the environmental sound ES2 in this case). Details of the calculation in operation S505 can be referred to explanations of the operation S304 and FIG. 6. Operation S507 is performed to receive the first environmental sound (which is the environmental sound ES2 in this case) sensed by the wearable electronic device 100 and the first distance and the first directional angle calculated by the wearable electronic device 100.

Operation S509 is performed to determine whether the first environmental sound sensed by the wearable electronic device 100 matches the second environmental sound sensed by the wearable electronic device 200. When the first environmental sound and the second environmental sound are matched (in this case, both of them have similar sound characteristics corresponding to the same environmental sound ES2 generated by the same source ESS2), operation S511 is performed to calculate a relative positional relationship between the wearable electronic device 100 and the wearable electronic device 200 according to the first distance, the first directional angle, the second distance and the second directional angle.

Because the first distance and the first directional angle indicates the position of the wearable electronic device 100 relative to the source ESS2 and also the second distance and the second directional angle indicates the position of the wearable electronic device 200 relative to the same source ESS2, the relative positional relationship between the wearable electronic device 100 and the wearable electronic device 200 can be derived from the first distance, the first directional angle, the second distance and the second directional angle.

In another embodiment, when the environmental sound ES2 generated by the same source ESS2, the environmental sound ES2 will be sensed by the first microphone 121 and the second microphone 122 of the wearable electronic device 100 and the first microphone 221 and the second microphone 222 of the wearable electronic device 200 at different time points. The relative positional relationship between the wearable electronic device 100 and the wearable electronic device 200 can be calculated according to time differences between the first microphone 121, the second microphone 122, the first microphone 221 and the second microphone 222 sensing the environmental sound ES2.

Based on the control method 500, the wearable electronic device 200 will be able to acknowledge the position of the wearable electronic device 100 in the real scene. Therefore, the control circuit 260 of the wearable electronic device 200 can generate a virtual object corresponding to the wearable electronic device 100 and add this virtual object into the virtual reality scene experience by the user U2, such that the user U2 in the virtual reality scene can aware of the user U1 nearby. In addition, the wearable electronic device 100 may also acknowledge the position of the wearable electronic device 200 according to the relative positional relationship.

In an embodiment, matching of the first environmental sound and the second environmental sound can be performed by calculating a correlation coefficient between the first and the second environmental sounds sensed by the wearable electronic devices 100 and 200. If the correlation coefficient is higher than a threshold value, the first environmental sound and the second environmental sound are matched.

In aforesaid embodiment, the user U1 of the wearable electronic device 100 and the user U2 of the wearable electronic device 200 will be able to locate each other according to the same environmental sound ES2.

Figure 12:
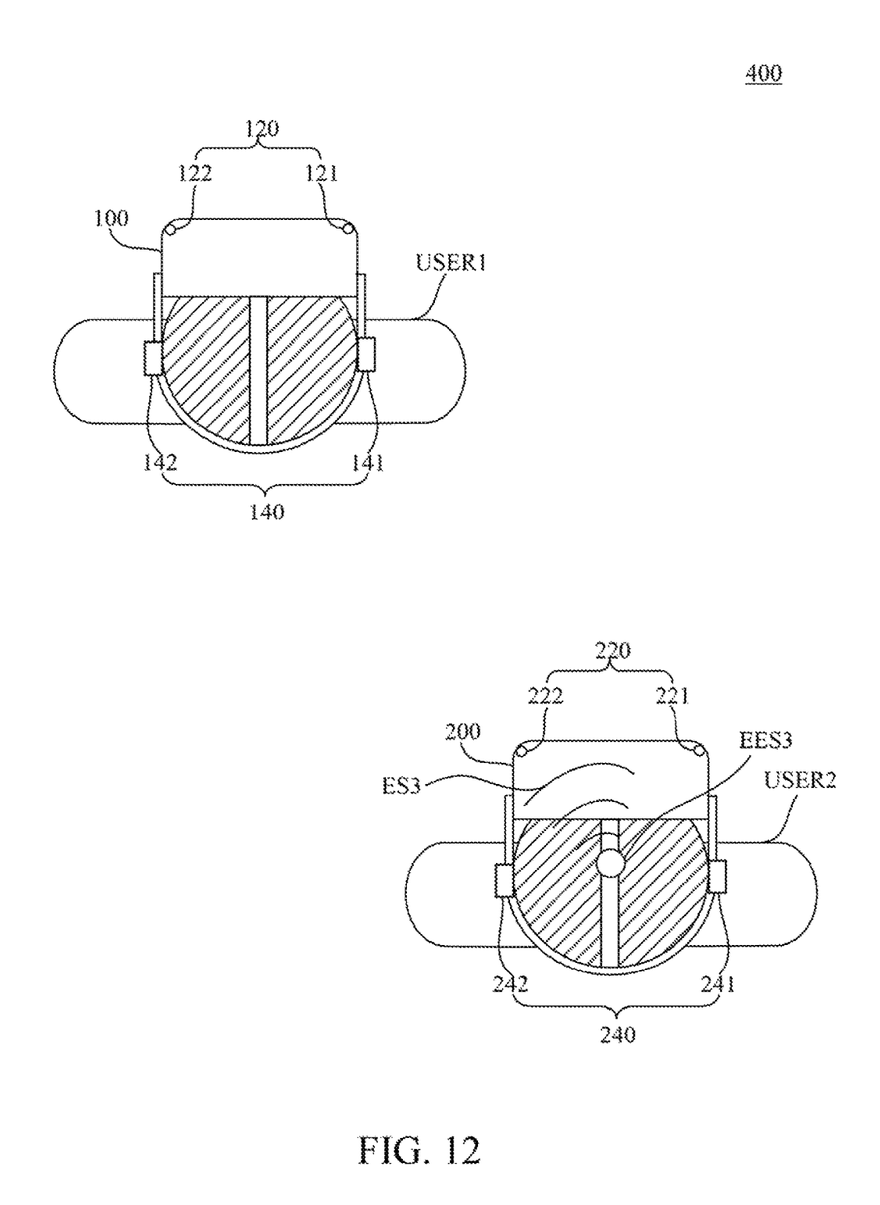
FIG. 12 is another schematic diagram illustrating the virtual reality system in FIG. 9.

Reference is also made to FIG. 12, which is another schematic diagram illustrating the virtual realty system 400 in FIG. 9. In the embodiment in FIG. 12, the environmental sound ES3 is a voice from the user U2 of the wearable electronic device 200. In this case, referring to FIG. 10 and FIG. 12, the second distance will be extremely short and the time difference between the microphones 241 and 242 in the microphone array 220 will also be extremely short (or even not existed), the wearable electronic device 200 will acknowledge that the environmental sound ES3 is the voice from the user U2 of the wearable electronic device 200.

As shown in FIG. 10, the wearable electronic device 100 may further include a network interface circuit 190. The network interface circuit 190 can be a WiFi transceiver, Zigbee transceiver, a telecommunication network transceiver (e.g., 2G, 3G, 4G or 5G telecommunication networks), a LAN network transceiver and/or any equivalent network transceiver. The network interface circuit 190 of the wearable electronic device 100 is wirelessly communicated with another wearable electronic device 200 as shown in FIG. 10. The network interface circuit 190 is coupled with the control circuit 160. The network interface circuit 190 is configured for receiving a network packet including the environmental sound ES3 sensed by the wearable electronic device 200.

When the environmental sound ES3 includes the user voice of the user U2, the control circuit 160 is further operable to verify a user identification corresponding to the wearable electronic device 200 according to the user voice.

Based on aforesaid embodiments, the wearable electronic device will be able to detect an incoming direction of an environmental sound and a distance between the source of the environmental sound and the wearable electronic device, such that the wearable electronic device can deliver the environmental sound to the user and also maintain spatial characteristics of the environmental sound. The environmental sound can be modified according to the virtual reality scene. In addition, the environmental sound can also be utilized to create a virtual object into the virtual reality scene. Furthermore, the environmental sound can be utilized to locate two wearable electronic devices in the virtual reality system.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wearable electronic device, comprising:
a microphone array, configured for sensing an environmental sound;
a plurality of stereo speakers; and
a control circuit, coupled to the microphone array and the stereo speakers, wherein the control circuit is operable to:
calculate a distance and a directional angle from a source of the environmental sound to the wearable electronic device according to the environmental sound sensed by the microphone array;
generate an effect sound corresponding to the environmental sound;
process the effect sound for simulating the effect sound to be originated from a virtual location with the distance and the directional angle relative to the wearable electronic device; and
broadcast the processed effect sound through the stereo speakers,
wherein the effect sound generated by the control circuit is generated by modifying the environmental sound according to an audio tone corresponding to a virtual reality scene.

2. The wearable electronic device of claim 1, wherein the microphone array comprises a first microphone and a second microphone, the first microphone and the second microphone are disposed at different locations on the wearable electronic device for sensing sound samples corresponding to the environmental sound.

3. The wearable electronic device of claim 2, wherein the control circuit is operable to calculate the distance from the source of the environmental sound to the wearable electronic device according to an intensity level of the sound samples sensed by the first microphone or the second microphone.

4. The wearable electronic device of claim 2, wherein the control circuit is operable to calculate the directional angle from the source of the environmental sound to the wearable electronic device according to a timing difference between the sound samples sensed by the first microphone and the second microphone.

5. The wearable electronic device of claim 1, wherein the wearable electronic device is a head-mounted display device comprising a displayer, the displayer is configured for showing a virtual reality scene, the processed effect sound is combined with a virtual world sound corresponding to the virtual reality scene to be broadcasted through the stereo speakers.

6. The wearable electronic device of claim 5, wherein the effect sound is generated by modifying the environmental sound according to an audio tone corresponding to the virtual reality scene.

7. The wearable electronic device of claim 5, wherein the control circuit is operable to:
generate a virtual object corresponding to the environmental sound at the virtual location with the distance and the directional angle relative to the wearable electronic device; and
combine the virtual object into the virtual reality scene.

8. The wearable electronic device of claim 1, further comprises a network interface circuit wirelessly communicated with another wearable electronic device, wherein the network interface circuit is configured for receiving a network packet comprising another environmental sound sensed by the another wearable electronic device, the another environmental sound comprises a user voice, the control circuit is further operable to verify a user identification corresponding to the another wearable electronic device according to the user voice.

9. A virtual reality system, comprising:
a first wearable electronic device, comprising:
a first microphone array for sensing a first environmental sound of an environmental scene;
a first network interface circuit; and
a first control circuit, coupled to the first microphone array and the first network interface circuit, wherein the first control circuit is operable to calculate a first distance and a first directional angle from a source of the first environmental sound to the first wearable electronic device according to the first environmental sound;
a second wearable electronic device, comprising:
a second microphone array for sensing a second environmental sound of the environmental scene;
a second network interface circuit communicated with the first network interface circuit, the second network interface circuit is configured for receiving the first environmental sound, the first distance and the first directional angle from the first wearable electronic device;
a second control circuit, coupled to the second microphone array and the second network interface circuit, wherein the second control circuit is operable to calculate a second distance and a second directional angle from a source of the second environmental sound to the second wearable electronic device according to the second environmental sound, the second control circuit is operable to calculate a relative positional relationship between the first wearable electronic device and the second wearable electronic device according to the first distance, the first directional angle, the second distance and the second directional angle.

10. The virtual reality system of claim 9, wherein the first microphone array comprises a first microphone and a second microphone, the first microphone and the second microphone are disposed at different locations on the first wearable electronic device for sensing sound samples corresponding to the first environmental sound.

11. The virtual reality system of claim 10, wherein the first control circuit is operable to calculate the first distance from the source of the first environmental sound to the first wearable electronic device according to an intensity level of the sound samples sensed by the first microphone or the second microphone.

12. The virtual reality system of claim 9, wherein the second wearable electronic device is a head-mounted display device comprising a displayer, the displayer is configured for showing a virtual reality scene.

13. The wearable electronic device of claim 5, wherein the second control circuit is operable to:

generate a virtual object corresponding to the first wearable electronic device at a virtual location according to the relative positional relationship; and combine the virtual object into the virtual reality scene.

14. A control method, suitable for a wearable electronic device comprising a microphone array and a plurality of stereo speakers, the control method comprising:

sensing an environmental sound by the microphone array;

calculating a distance and a directional angle from a source of the environmental sound to the wearable electronic device according to the environmental sound;

generating an effect sound corresponding to the environmental sound;

processing the effect sound for simulating the effect sound to be originated from a virtual location with the distance and the directional angle relative to the wearable electronic device; and broadcasting the processed effect sound through the stereo speakers, wherein the effect sound generated by the control circuit is generated by modifying the environmental sound according to an audio tone corresponding to a virtual reality scene.

15. The control method of claim 14, the microphone array comprises a first microphone and a second microphone, the first microphone and the second microphone are disposed at different locations on the wearable electronic device for sensing sound samples corresponding to the environmental sound.

16. The control method of claim 15, wherein step of calculating the distance and the directional angle comprises:

calculating the distance from the source of the environmental sound to the wearable electronic device according to an intensity level of the sound samples sensed by the first microphone and the second microphone; and calculating the directional angle from the source of the environmental sound to the wearable electronic device according to a timing difference between the sound samples sensed by the first microphone and the second microphone.

17. The control method of claim 14, wherein the wearable electronic device is a head-mounted display device comprising a displayer, the displayer is configured for showing a virtual reality scene, the control method comprises:

combining the processed effect sound with a virtual world sound corresponding to the virtual reality scene to be broadcasted through the stereo speakers.

18. The control method of claim 17, wherein the effect sound is generated by modifying the environmental sound according to an audio tone corresponding to the virtual reality scene.

19. The control method of claim 17, wherein the control method comprises:

generating a virtual object corresponding to the environmental sound at the virtual location with the distance and the directional angle relative to the wearable electronic device; and combining the virtual object into the virtual reality scene.

20. A control method, suitable for a virtual reality system comprising a first wearable electronic device and a second wearable electronic device, the control method comprising:

sensing a first environmental sound of an environmental scene by the first wearable electronic device, and sensing a second environmental sound of the environmental scene by the second wearable electronic device;

calculate a first distance and a first directional angle from a source of the first environmental sound to the first wearable electronic device according to the first environmental sound;

calculate a second distance and a second directional angle from a source of the second environmental sound to the second wearable electronic device according to the second environmental sound; and calculate a relative positional relationship between the first wearable electronic device and the second wearable electronic device according to the first distance, the first directional angle, the second distance and the second directional angle.

* * * * *